United States Patent [19]

Huber et al.

[11] Patent Number: 5,443,338
[45] Date of Patent: Aug. 22, 1995

[54] MACHINE FOR THE PRECISION WORKING OF THE TOOTH FLANKS OF GEAR-SHAPED WORKPIECES WITH AN INTERNALLY TOOTHED TOOL

[75] Inventors: Manfred Huber; Richard Mueller, both of Munich; Anton Schaller, Eching, all of Germany

[73] Assignee: Hurth Maschinen und Werkzeuge GmbH, Munich, Germany

[21] Appl. No.: 271,512

[22] Filed: Jul. 7, 1994

[30] Foreign Application Priority Data

Jul. 16, 1993 [DE] Germany .................. 43 23 935.8

[51] Int. Cl.⁶ .................. B23F 19/06; B23F 23/04
[52] U.S. Cl. .................. 409/7; 409/37; 451/147; 451/900
[58] Field of Search .................. 409/7, 33, 37, 49; 51/26, 73 R, 105 GG, 287, DIG. 1; 72/101, 102; 451/147, 219, 253, 275, 900

[56] References Cited

U.S. PATENT DOCUMENTS

| | | | |
|---|---|---|---|
| 3,169,446 | 2/1965 | Anderson et al. | 409/7 |
| 4,359,301 | 11/1982 | Spensberger et al. | 409/37 X |
| 4,519,733 | 5/1985 | Gregg | 409/7 |
| 4,630,404 | 12/1986 | Erhardt et al. | 51/105 GG |
| 4,743,147 | 5/1988 | Bettocchi | 409/7 |
| 4,757,644 | 7/1988 | Erhardt et al. | 51/105 GG |

FOREIGN PATENT DOCUMENTS

| | | | |
|---|---|---|---|
| 2604281 | 8/1976 | Germany . | |
| 2719524 | 12/1977 | Germany | 51/287 |
| 2711282 | 9/1978 | Germany . | |
| 9300936.4 | 7/1993 | Germany . | |
| 0060919 | 3/1991 | Japan | 409/49 |

*Primary Examiner*—Z. R. Bilinsky
*Attorney, Agent, or Firm*—Flynn, Thiel, Boutell & Tanis

[57] ABSTRACT

A machine for the precision working of tooth flanks of a gear-shaped workpiece. The machine having an internally toothed tool, a tool head angularly adjustable about an axis directed transversely with respect to a workpiece axis for rotationally drivably receiving the tool, means for receiving the workpiece to be machined and means for accomplishing the feeding and working movements of the tool relative to the workpiece in which movable tables existing in conventional machines for receiving the workpieces are avoided with the disadvantages resulting therefrom. The machine also having a frame, a first carriage horizontally movable in an X-direction transversely with respect to a workpiece axis, on which carriage is arranged a second carriage vertically movable in a Y-direction. The tool head is received pivotally about an axis lying in the X-direction in a circular guide in the second carriage. On each side of the tool head there are provided a headstock and a tailstock for receiving the workpiece. The headstock and tailstock are movable on the machine frame in the Z-direction, namely in the direction of the workpiece axis. The headstock is drivable and the tailstock follows correspondingly.

5 Claims, 3 Drawing Sheets

MACHINE FOR THE PRECISION WORKING OF THE TOOTH FLANKS OF GEAR-SHAPED WORKPIECES WITH AN INTERNALLY TOOTHED TOOL

FIELD OF THE INVENTION

This invention relates to a machine for the precision working of the tooth flanks of a gear-shaped workpiece, and more particularly to a machine with a tool head which can be angularly adjusted transversely with respect to an axis of the workpiece for rotationally drivably receiving an internally toothed tool.

BACKGROUND OF THE INVENTION

In a machine known from DE 27 19 524 A1, the devices carrying a workpiece are arranged on a work table, which during the machining operation carries out back and forth movements in a direction along a workpiece axis. A jerky operating sequence occurs in particular during a return movement because of the relatively large mass of the table. The jerky sequence of movement appears on the tooth flanks of the workpiece as a measurable, and at times also as a visible, wavy or also slightly step-like surface, which is generally not damaging. The flanks then do not correspond with the contours and surface roughnesses, which is then noticeable during operation, for example, through increased noise development.

Part of the present state of the art is also a machine of the above-mentioned type, in which on the movable table there is arranged an intermediate table supported and centered by a central, vertical pivot pin, which intermediate table is adjustable or pivotal in a horizontal plane by means of a bar or an NC-axis, and on which two tailstocks are mounted for clamping the workpiece. The workpiece, in order to clamp or mount to the machine, must be threaded in manually, or, in the case of an automatic loading, at least one tailstock must be moved on the intermediate table. The manually or automatically started clamping movement is carried out by spindle sleeves or tail spindles. Here too, the large mass of the table is a disadvantage, and in addition, the multiple layers of tables one above the other are disadvantageous since, in the case of a hydraulic clamping movement, the intermediate table can buckle, thus can be deformed.

The prior art machine is loaded by means of a portal loader with twin gripping means mounted above and parallel with respect to the workpiece axis and with the disadvantage that the work chamber of the machine, which work chamber is closed during the machining operation, must be opened upwardly for the tool exchange, with the exiting of oil mist being hardly avoidable. Furthermore, the machine is very tall because of the loading from above feature.

Starting out from these disadvantages, the basic purpose of the invention is to further provide a machine of the above-mentioned type such that the mentioned disadvantages are avoided.

SUMMARY OF THE INVENTION

This purpose is attained by moving the workpiece in a Z-direction and by moving a tool head in a Y-direction. Thus, there exists a cross-slide function, which in connection with a radial feed movement in an X-direction enables all required movements without a table pivoting, or the like being carried out. It is possible to work the machine designed according to the present invention according to the so-called plunge method, the so-called parallel method or the so-called diagonal method. Also, producing spherical and/or conical tooth flanks is possible. The machine also permits the use of wide tools, or those tools with a roughing and finishing zone by shifting the tool.

The development of the present machine is advantageous for producing special tooth shapes.

The further development of the present machine achieves a compact design even with the arrangement of a handling mechanism. The disclosed handling mechanism, fixedly integrated into the machine, permits handling of all suitable gear shapes and shafts outside of the actual machining or wet space, which can thus be kept very small and can be closed with simple elements. The invention permits many modifications falling within the wording of the claims, which modifications are covered by the claims.

BRIEF DESCRIPTION OF THE DRAWINGS

The invention will be described in greater detail hereinafter in connection with two exemplary embodiments illustrated in the four figures, in which.

DETAILED DESCRIPTION

Figure 1:
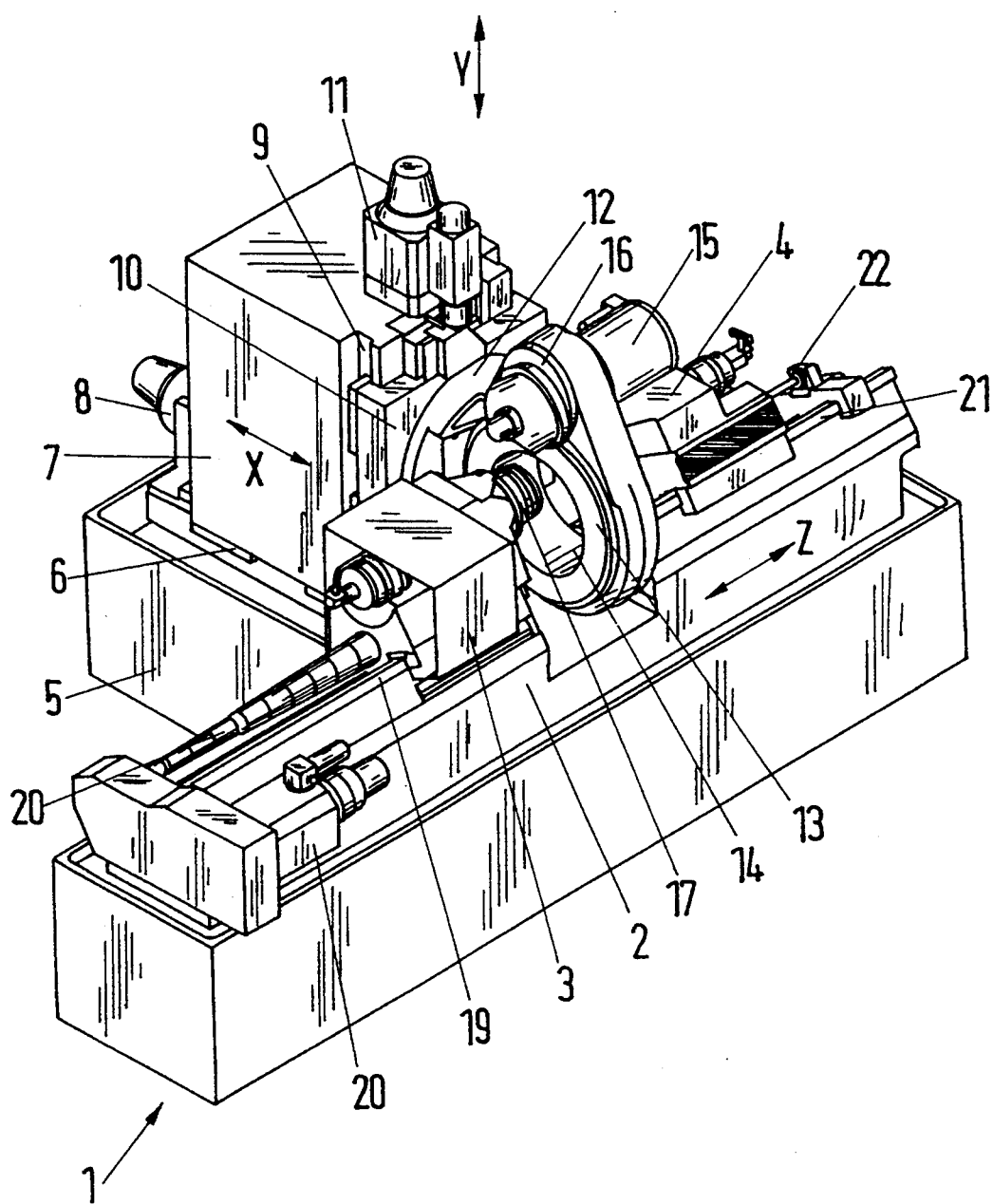
FIG. 1 is a perspective view of the design of the machine of the invention.
Figure 2:
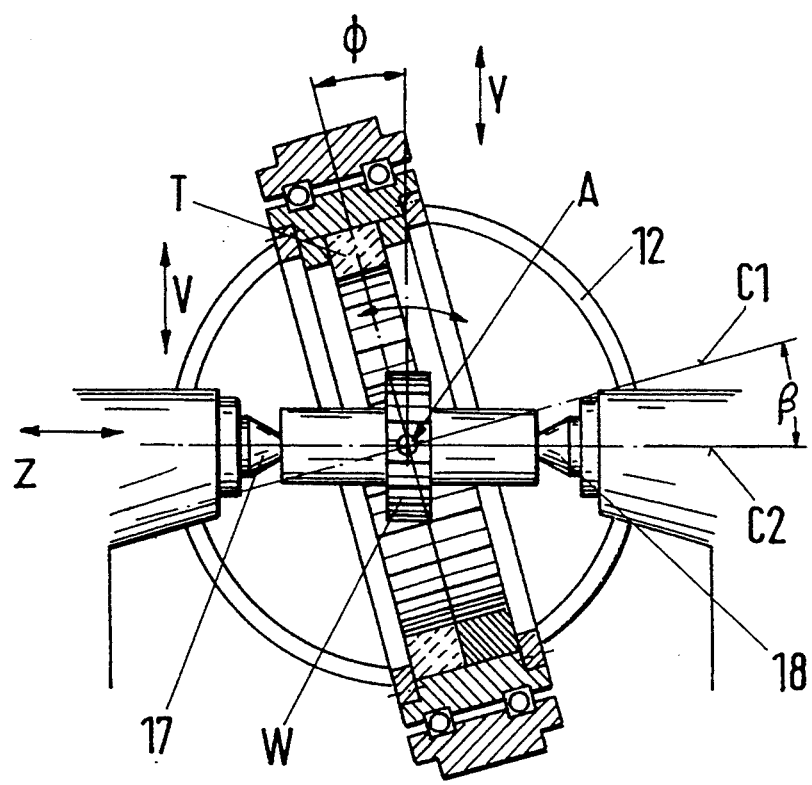
FIG. 2 is a vertical cross-sectional view of the work chamber taken along lines 2—2 of FIG. 1.
Figure 3:
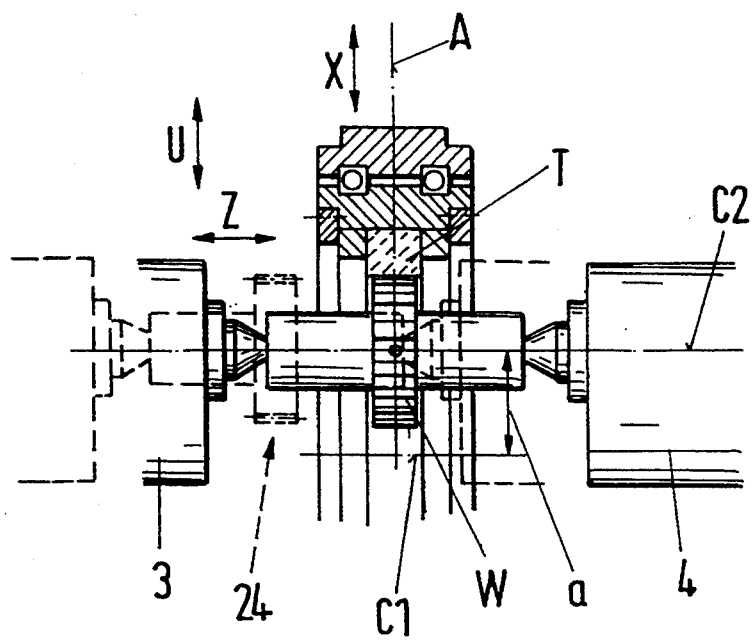
FIGS. 3 is a horizontal cross-sectional view of the work chamber taken along lines 3—3 of FIG. 1.

The machine illustrated in FIGS. 1 to 3 has a machine frame 1 having a horizontal approximately T-shaped configuration. The area corresponding with the crossbeam of the T-shaped frame on the front side of the machine forms a machine bed 2 on which a headstock 3 and a tailstock 4 are movably arranged. On the other area 5 of the machine frame 1, which area 5 extends approximately from the center of the machine bed 2 rearwardly at a right angle thereto, there is arranged a horizontal carriage 7 movable in the arrow direction X in a longitudinal guide 6 and drivable by a motor 8. The horizontal carriage 7 has on its side facing the bed 2 a vertical guide 9 in which a vertical carriage 10 is arranged elevationally adjustably in the arrow direction Y and drivable by a motor 11. On the side not facing the horizontal carriage 7, the vertical carriage 10 has a circular guide 12, only indicated in FIG. 1, in which circular guide is received a tool head 13 angularly adjustable about an axis A lying in the X-direction. The tool head 13 projects thereby essentially between the headstock 3 and the tailstock 4. An internally toothed tool T is received rotationally drivably in a center opening 14 of the tool head 13. The drive for the tool comes from a motor 15 through a gearing 16 (only indicated) with backlash-free preloaded gears or a chain drive.

The headstock 3 and the tailstock 4 have devices 17, 18 for clamping a gear-like workpiece W which, during machining, is inside of the tool T in a mating tooth engagement with the tool. The workpiece axis C2, the mentioned axis A and, when the tool T is not pivoted, the tool axis C1 lie thereby in one plane. To change the workpiece W, it is moved out from the tool T. The headstock 3 on the bed 2 is, for this purpose, movable in the arrow direction Z in a guide 19 by means of a hydraulic or preferably an electrical drive 20, and the tailstock follows also in the arrow direction Z in a guide 21, for which purpose a control (not illustrated) and an electrical or preferably a hydraulic drive 22 are provided. In order not to affect the action of the clamping devices 17, 18 during the movement of the headstock 3 and the tailstock 4, the headstock 3 is drivable and the tailstock 4 is suitably controlled to follow the headstock.

Each of the arrow directions X, Y and Z extend perpendicularly with respect to the two others.

The tool T is usually an internally toothed honing cutter or hard-finishing cutter, or the like, with an abrasive surface of its tooth flanks, namely a surface not having any geometrically defined cutting edges, for the precision working of particularly hardened workpieces. It may also be significantly wider than shown in FIG. 3, or as shown in the lower half of FIG. 2, may have structures differing over the width of its flanks for finishing, with the tool T during the machining having to be shifted relative to the workpiece W in order to utilize the different flank areas. Instead of the mentioned abrasive tools, it is, however, also possible to use for the machining of not yet hardened workpieces, internally toothed finishing cutters or shaving cutters with geometrically defined edges on their tooth flanks.

During the precision working with gear-shaped tools work is usually done with a crossed-axes angle $\beta$ between the tool axis of rotation C1 and the workpiece axis of rotation C2. The tool head 13 is for this purpose pivoted with the tool T about the axis A through an angle $\phi$ so that the axis C1 extends inclined with respect to the axis C2, which always extends in the arrow direction Z. The feed movement of the tool T relative to the workpiece W in the sense of a change of the center distance (a) is accomplished by moving the horizontal carriage 7 in the arrow direction X. A relative movement between the tool T and workpiece W in the axis direction C2 is needed during the parallel and diagonal movements. The relative movement in the axis direction C2 is accomplished by driving the headstock 3 with the tailstock 4 suitably controlled to follow the headstock 3. The diagonal movement is accomplished by superimposing a vertical movement of the tool T on the parallel movement. The vertical movement is directed perpendicularly to the parallel movement and is accomplished by moving the vertical carriage 10 in the arrow direction Y. To produce spherical and/or conical tooth flanks, a movement of the tool T in the arrow direction X is additionally added to the parallel and vertical movements. This principle is known from pending U.S. application Ser. No. 08/056 368, filed on Apr. 30, 1993 and assigned to the same Assignee as the present application.

It is desired and even necessary at times not to drive the workpiece W with the tool T, but to separately drive the workpiece W. In such cases, it is possible to equip the machine, as this is known from DE 27 11 282 A1, with electronically coupled individual drives for the tool T and for the workpiece W. The drive (not illustrated) for the workpiece W is thereby stored in or on the headstock 3.

Figure 4:
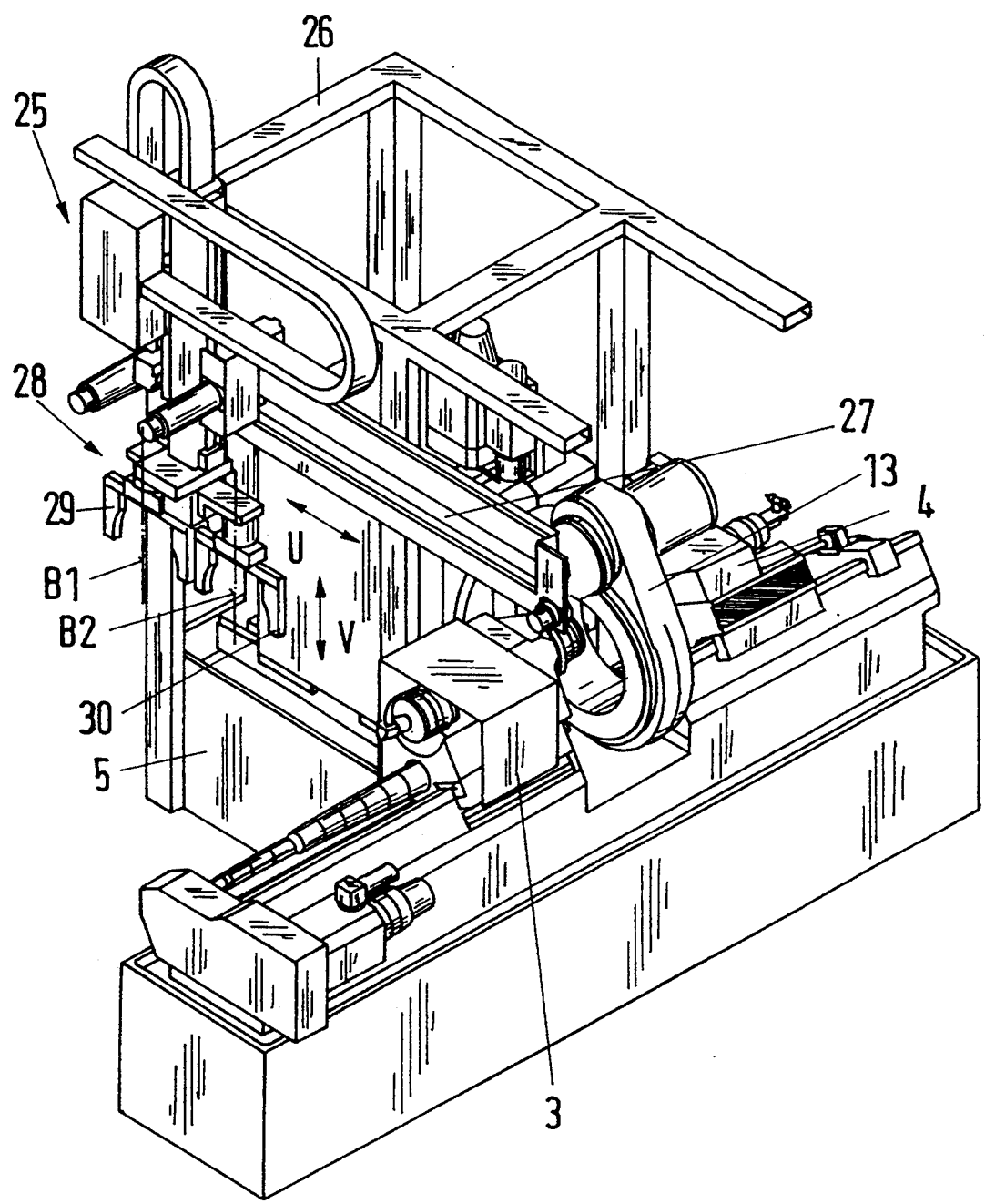
FIG. 4 shows a modification of the machine shown in FIG. 1 with an integrated handling mechanism.

The design of the machine with the T-shaped machine frame 1 enables the space-saving arrangement of a handling mechanism 25. Same has a frame 26, which is, laterally of the area 5 of the machine frame 1, connected to same and projects over same including the horizontal carriage 7. On the side of the frame 26 facing the headstock 3, there is mounted a guide 27, in which a gripping mechanism 28 can be moved horizontally in the arrow direction U, namely parallel with respect to the arrow direction X, toward the machine bed 2 and away from same. The gripping mechanism 28 has two gripping means 29, 30, which are movable vertically in the arrow direction V, namely parallel with respect to the arrow direction Y, of which gripping means 29, 30 for example one (29) receives a workpiece W to be machined and the other one (30) a workpiece, which has been finished. To change the workpiece, the headstock 3 and the tailstock 4 are, as described above, moved like in FIG. 4 so far to the left until a finished workpiece received by them is outside of the internally toothed tool T and of the headstock 3 in a transfer position 24. The gripping mechanism 28 is moved in such a manner to the transfer position 24 that the free gripping means 30 can receive the workpiece released by the clamping devices 17, 18. The gripping mechanism 28 is then moved on until the workpiece to be machined and held by the other gripping means 29 reaches the transfer position 24, where it is received by the clamping devices 17, 18. The gripping mechanism 28 is finally returned into the illustrated position and the workpiece to be machined is moved into the tool T by suitably moving the headstock 3 and the tailstock 4, whereby moving the horizontal carriage 7 in the sense of a center-distance reduction the tooth engagement between tool T and workpiece W is created. In order to prevent damage of the tool and/or workpiece tooth flanks, even in the case of a position-correctly supplied workpiece, there occurs simultaneously with the center-distance change a corresponding change of the crossed-axes angle $\beta$, as this is known from U.S. Pat. No. 4,757,644, issued Jul. 19, 1988 and assigned to the same Assignee as the present invention. The gripping means 30 places the workpiece, which it holds, onto a magazine or conveyor (not illustrated) or transfers it to an external handling mechanism, and the other gripping means 29 receives from a different magazine or conveyor or from a different external handling mechanism (also not illustrated) a new workpiece. Depending on the situation, the gripping means 29, 30 can be pivoted about their vertical axes B1, B2 and/or can be moved in addition parallel to the arrow direction Z on the gripping mechanism 28. In this regard the illustrated gripping mechanism 28 is to be viewed only as one of many possible designs.

When a given number of workpieces W have been machined, it is also possible to feed to the machine in the place of a new workpiece W to be machined, a dressing wheel (not illustrated) with the same dimensions, with which the tool T can again be dressed.

It can easily be recognized from FIG. 3 that the relatively small work chamber of the machine can be surrounded by simple conventional means, like wall and window elements, which means are not illustrated for a better overview, and can be closed in this manner. A suitable opening is thereby to be provided only on the rear side for the gripping mechanism, which opening is usually closed, for example, by elastic flaps, which extensively prevent the exiting of oil mist, however, enable without any help the passage of the gripping mechanism.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a machine for the precision working of tooth flanks of a gear-shaped workpiece, the workpiece having a first axis of rotation, said machine having a tool head for supporting and rotatably driving an annular internally toothed tool for rotation about a second axis of rotation and for angular movement about a third axis oriented transversely with respect to said first axis of rotation, said machine also having first means for supporting the workpiece to be machined and second means for accomplishing relative feeding and working movements between the tool and the workpiece, wherein the improvement comprises:

a machine bed on which is directly supported a first carriage movable along an X-direction oriented transversely with respect to the workpiece axis of rotation;

a drivingly movable second carriage guidingly mounted on said first carriage and for movement along a Y-direction oriented perpendicularly with respect to the workpiece axis of rotation and to the X-direction, said tool head being mounted on said second carriage on a side thereof remote from said first carriage and for movement therewith; and wherein said first means includes a headstock and a tailstock movably supported on said machine bed and on opposite sides of said tool head and for movement along a Z-direction oriented perpendicularly with respect to the X-direction and to the Y-direction, the workpiece being supported by and between said headstock and said tailstock so that said first axis of rotation thereof extends in the Z-direction, and wherein said headstock is drivable along the Z-direction and the tailstock is suitably controlled to follow the headstock so as to facilitate a relative movement between the workpiece and the tool along the Z-direction.

2. The machine according to claim 1, wherein drive means are provided for rotatably driving the workpiece and, wherein electronically coupled individual drives are respectively provided for the tool and for the workpiece.

3. The machine according to claim 1, wherein said machine bed further comprises an integrated handling mechanism for supplying workpieces to be machined to a transfer position laterally next to the tool head and for transferring of machined workpieces to and from the transfer position, said integrated handling mechanism including a frame connected to the machine bed and means guided movably thereon for receiving, moving and transferring of the workpieces.

4. The machine according to claim 3, wherein the integrated handlings mechanism for receiving, moving and transferring can be moved parallel with respect to at least one of the X-direction and the Y-direction on the frame and is arranged adjacent a side of said first carriage facing said headstock.

5. The machine according to claim 2, wherein said machine bed further comprises an integrated handling mechanism for supplying workpieces to be machined to a transfer position laterally next to the tool head and for transferring of machined workpieces to and from the transfer position, said integrated handling mechanism including a frame connected to the machine bed and means guided movably thereon for receiving, moving and transferring of the workpieces.

* * * * *